United States Patent
Hsu

(10) Patent No.: US 8,950,906 B2
(45) Date of Patent: Feb. 10, 2015

(54) ZOOM LENS WITH MULTI-LAYERS FOR ILLUMINATION

(71) Applicant: Chen-Wei Hsu, Tainan (TW)

(72) Inventor: Chen-Wei Hsu, Tainan (TW)

( * ) Notice: Subject to any disclaimer, the term of this patent is extended or adjusted under 35 U.S.C. 154(b) by 164 days.

(21) Appl. No.: 13/760,080

(22) Filed: Feb. 6, 2013

(65) Prior Publication Data

US 2014/0218939 A1    Aug. 7, 2014

(51) Int. Cl.
| | |
|---|---|
| B60Q 1/24 | (2006.01) |
| F21V 13/04 | (2006.01) |
| F21V 5/04 | (2006.01) |
| F21S 8/10 | (2006.01) |
| G02B 3/08 | (2006.01) |
| F21Y 101/02 | (2006.01) |

(52) U.S. Cl.
CPC . *F21V 5/04* (2013.01); *F21S 48/00* (2013.01); *F21V 5/045* (2013.01); *G02B 3/08* (2013.01); *F21Y 2101/02* (2013.01)
USPC .......................................... 362/338; 362/517

(58) Field of Classification Search
USPC ........................................................ 362/338
See application file for complete search history.

(56) References Cited

U.S. PATENT DOCUMENTS

| | | | | |
|---|---|---|---|---|
| 1,208,456 | A * | 12/1916 | Bell ............................... | 362/309 |
| 2003/0007359 | A1* | 1/2003 | Sugawara et al. ............. | 362/326 |
| 2011/0205748 | A1* | 8/2011 | Yatsuda ........................ | 362/517 |

* cited by examiner

*Primary Examiner* — Joseph L Williams

(57) ABSTRACT

A multi-focal lens for a lighting device includes a central portion and multiple peripheral portions around the central portion. The central portion has a central convex refracting surface, and each peripheral portion has an oblique refracting surface and a convex refracting surface opposite to the oblique refracting surface, wherein the oblique refracting surface extends at an angle with respect to the optical axis of the multi-focal lens. The central portion and the peripheral portions share a common flat surface opposite to the refracting surfaces of the central portion and the peripheral portions. The convex refracting surface and the oblique refracting surface of each peripheral portion can change the paths of corresponding light rays refracted from the flat surface to increase the distance and area of illumination. Furthermore, the volume and thickness of the lens required for a lighting device can be reduced, so that the production cost can be reduced.

7 Claims, 11 Drawing Sheets

ZOOM LENS WITH MULTI-LAYERS FOR ILLUMINATION

FIELD OF THE INVENTION

The present invention relates to a multi-focal lens for a lighting device, and particularly to a lens that includes multiple convex refracting surfaces and multiple oblique refracting surfaces to change the paths of the light rays emitting from a light source of a lighting device so as to increase the distance and area of illumination, whereby the volume and thickness of the lens and the production cost of the lens can be reduced.

DESCRIPTION OF THE PRIOR ART

Commonly, LED has been used to replace most of the bulbs, such as vehicle lamp, street lamp, flashlight and searchlight for friendly environmental purpose. However, the projection area of an LED is smaller than that of an incandescent bulb, because the light rays emitting from the LED are directional while the light rays emitting from the incandescent bulb are omnidirectional. Generally, as shown in FIG. 1, a hemispheric lens 11 is arranged in front of an LED 10 and a light reflector 12 is arranged behind the LED 10 so as to increase the illumination distance of the LED 10. For increasing the illumination area, multiple LEDs can be provided in a lamp. However, the hemispheric lens 11 is unable to effectively change the paths of the light rays incident on the lens's edge to have them travel substantially parallel to the optical axis thereof. As a result, the central portion of the light passing through the hemispheric lens is much brighter than the surrounding portion thereof. Moreover, the hemispheric lens requires greater thickness and volume in order to achieve a desired illumination distance, thereby increasing the production cost.

SUMMARY OF THE PRESENT INVENTION

Accordingly, one object of the present invention is to provide a multi-focal lens for a lighting device, which can reduce the volume and thickness of the lens, lower the production cost, and increase the illumination distance as well as the illumination area.

Another object of the present invention to provide a multi-focal lens for a lighting device, which allows the lighting device to produce a lighting pattern.

To achieve the above objects, a first embodiment of the multi-focal lens is provided, which comprises a central portion and multiple peripheral portions around the central portion, wherein the central portion has a central convex refracting surface, and each of peripheral portions has an oblique refracting surface and a convex refracting surface opposite to the oblique refracting surface, the oblique refracting surface extending at an angle with respect to the optical axis of the multi-focal lens, the central portion and the peripheral portions sharing a common flat surface opposite to the refracting surfaces of the central portion and the peripheral portions.

According to one aspect of the first embodiment of the present invention, the peripheral portions can be symmetrical both about vertical and horizontal central lines of the central portion.

According to another aspect of the first embodiment of the present invention, the peripheral portions can be symmetrical only about a vertical central line of the central portion.

According to a further aspect of the first embodiment of the present invention, the peripheral portions can be symmetrical only about a horizontal central line of the central portion.

A second embodiment of the multi-focal lens is provided, which comprises two optical units being arranged side by side and formed together, wherein each optical unit includes a central portion and multiple peripheral portions around the central portion.

DETAILED DESCRIPTION OF THE INVENTION

Figure 1:
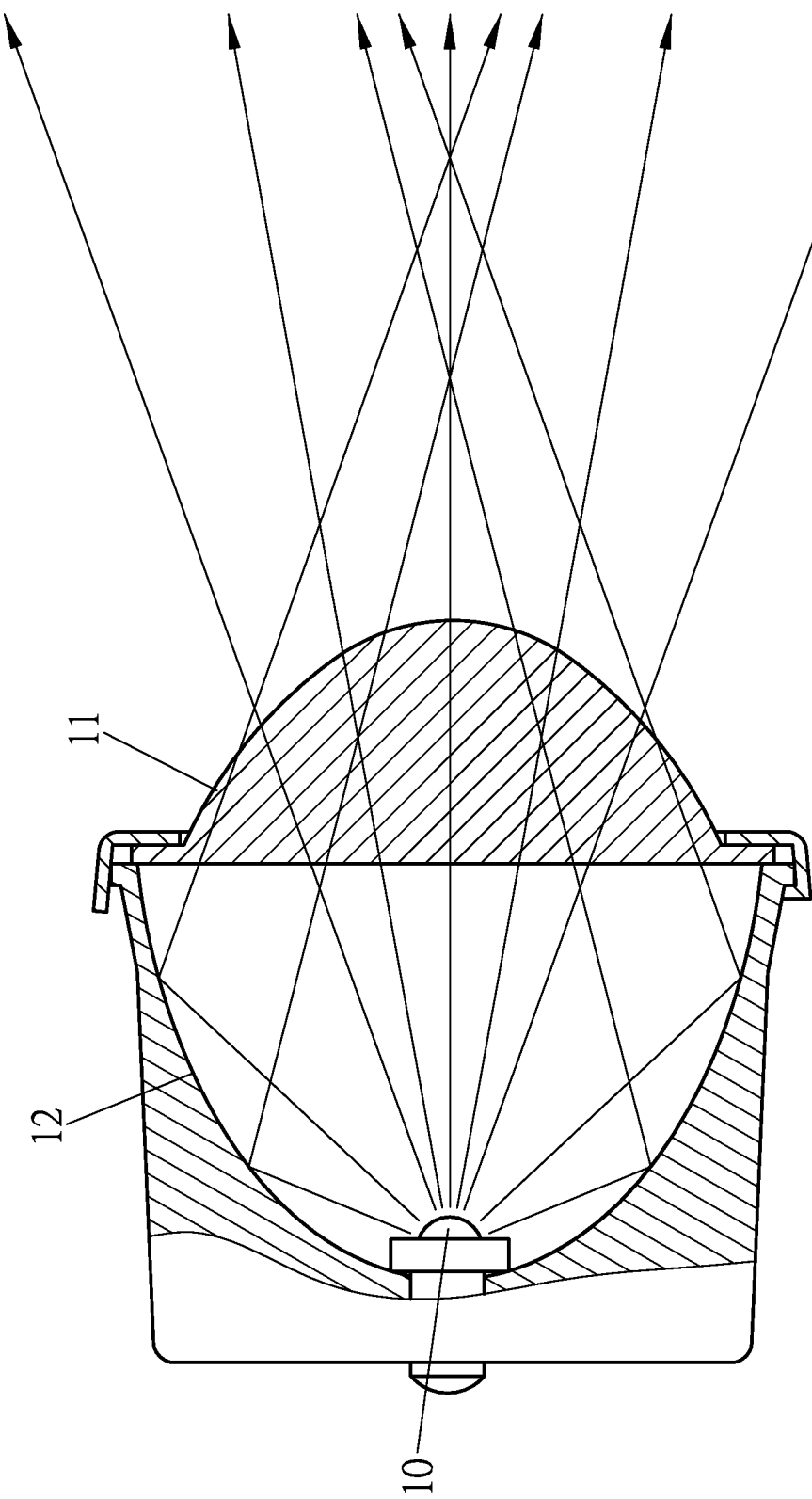
FIG. 1 is a schematic view showing a prior-art lens applied to a lamp.
Figure 2:
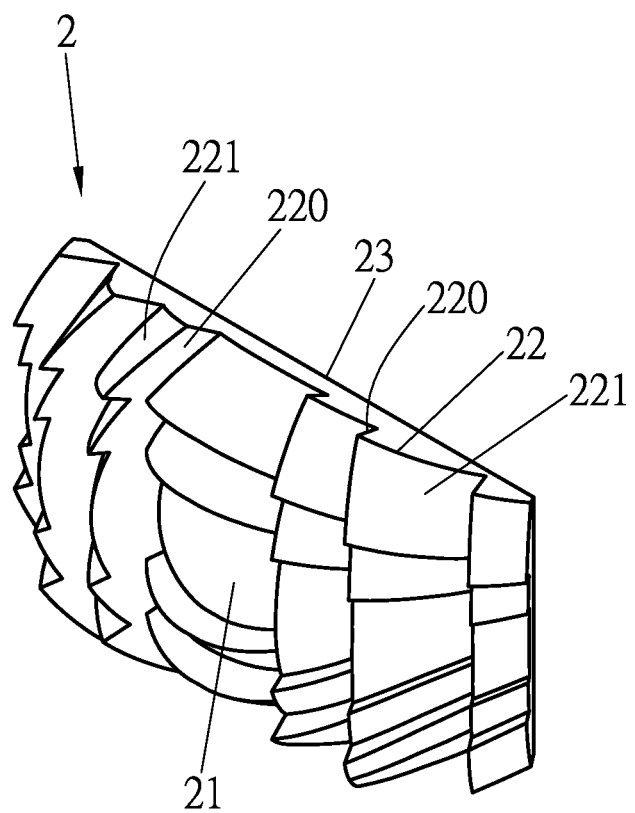
FIG. 2 is a perspective view showing a first embodiment of the present invention.
Figure 3:
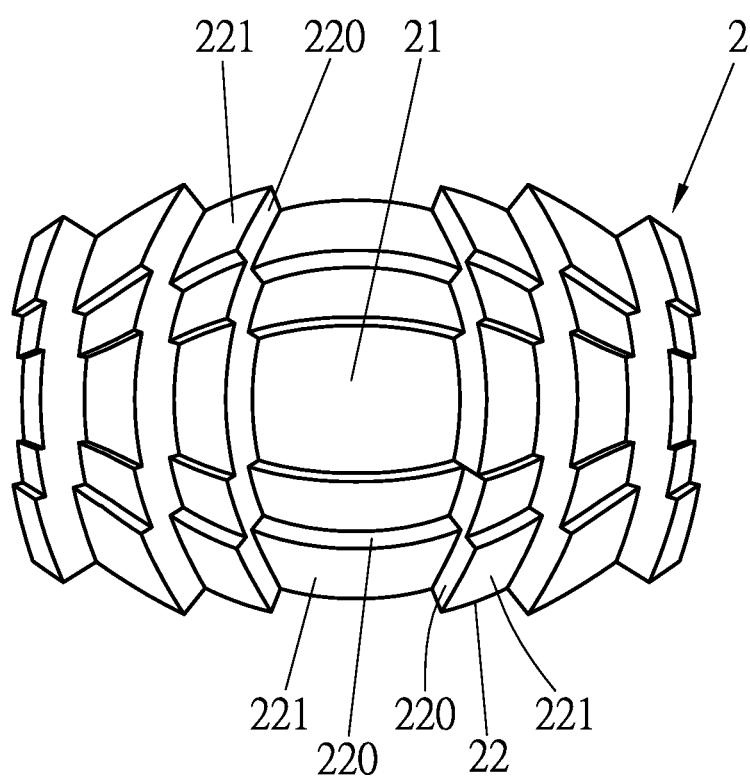
FIG. 3 is a front view showing the first embodiment of the present invention.
Figure 4:
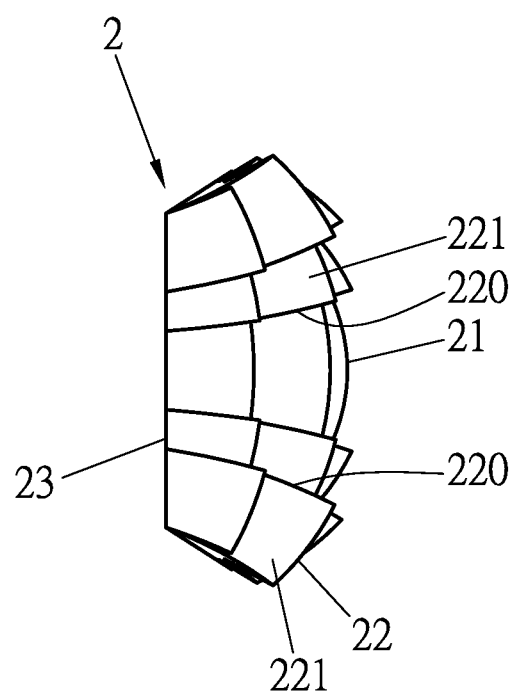
FIG. 4 is a side view showing the first embodiment of the present invention.
Figure 5:
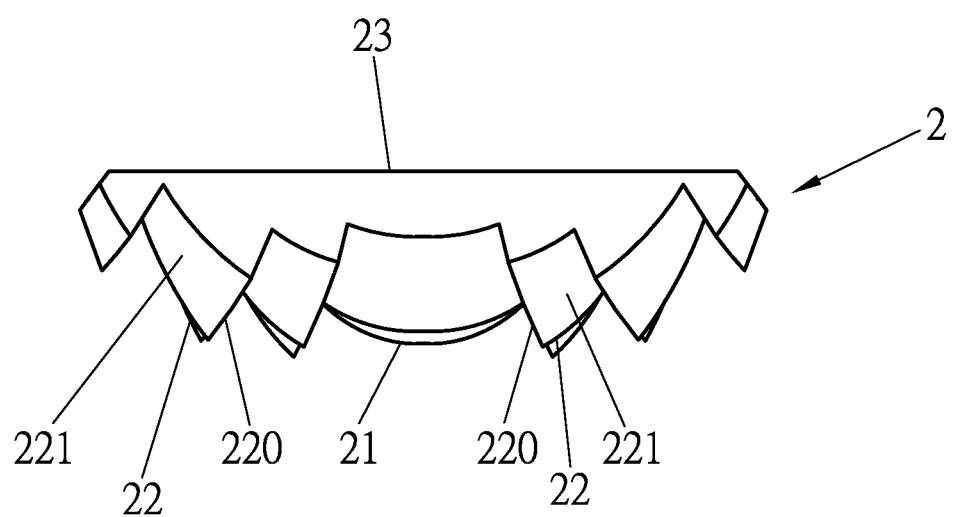
FIG. 5 is a top view showing the first embodiment of the present invention.

In order that those skilled in the art can further understand the present invention, a description will be provided in the following in details. However, these descriptions and the appended drawings are only used to enable those skilled in the art to understand the objects, features, and characteristics of the present invention, but not to be used to confine the scope and spirit of the present invention defined in the appended claims.

FIGS. 2 to 5 shows a multi-focal lens for a lighting device according to a first embodiment of the present invention. The multi-focal lens is basically a transparent body 2, which comprises a central portion 21 and multiple peripheral portions 22 around the central portion 21. The central portion 21 has a central convex refracting surface. Each of the peripheral portions 22 has an oblique refracting surface 220 and a convex refracting surface 221 opposite to the oblique refracting surface 220, wherein the oblique refracting surface 220 extends at an angle with respect to the optical axis of the multi-focal lens; namely, the oblique refracting surface 220 is not parallel to the optical axis of the multi-focal lens. The central portion 21 and the peripheral portions 22 share a common flat surface 23, which is opposite to the central convex refracting surface of the central portion 21 and the oblique refracting surfaces 220 and the convex refracting surfaces 221 of the peripheral portions 22. Furthermore, the convex refracting surfaces 221 are each configured with a specific focal point, so that the transparent body 2 becomes a multi-focal lens, which can be applied to a lighting device, especially to a lighting device required for producing a long-distance and wide-area illumination.

Figure 6:
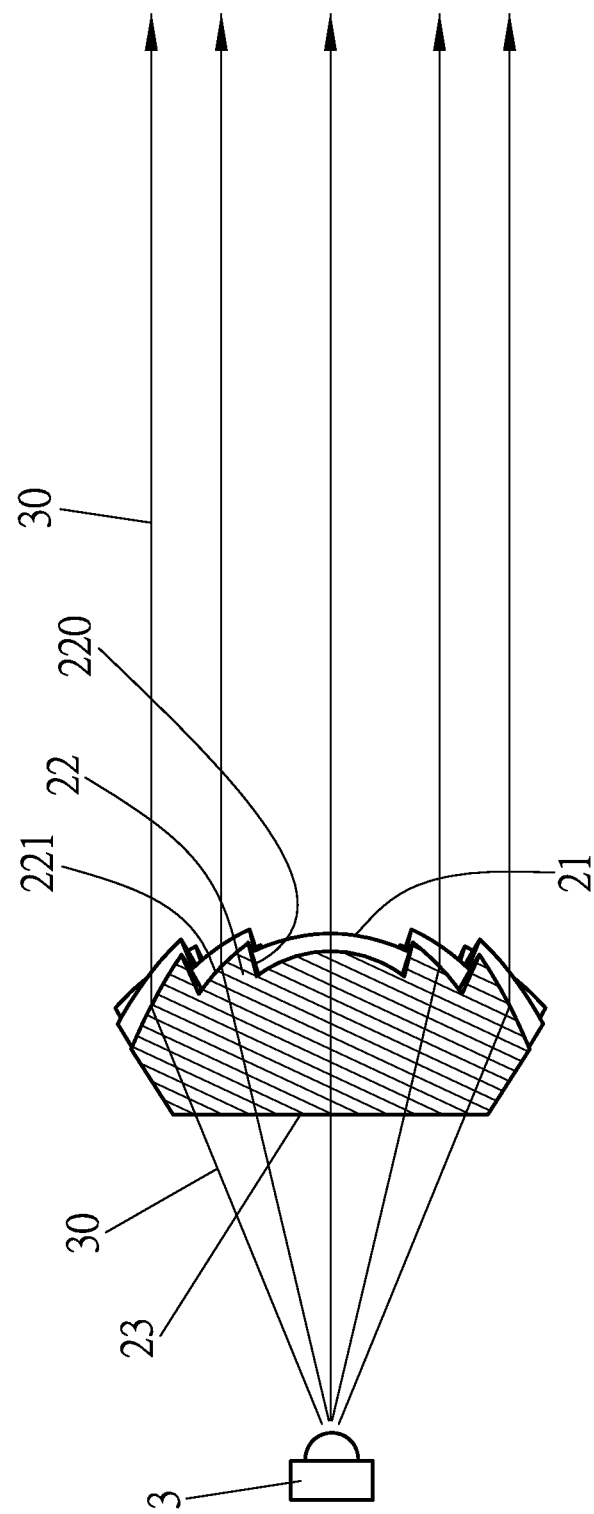
FIG. 6 is a side schematic view showing the light projection of the first embodiment of the present invention.
Figure 7:
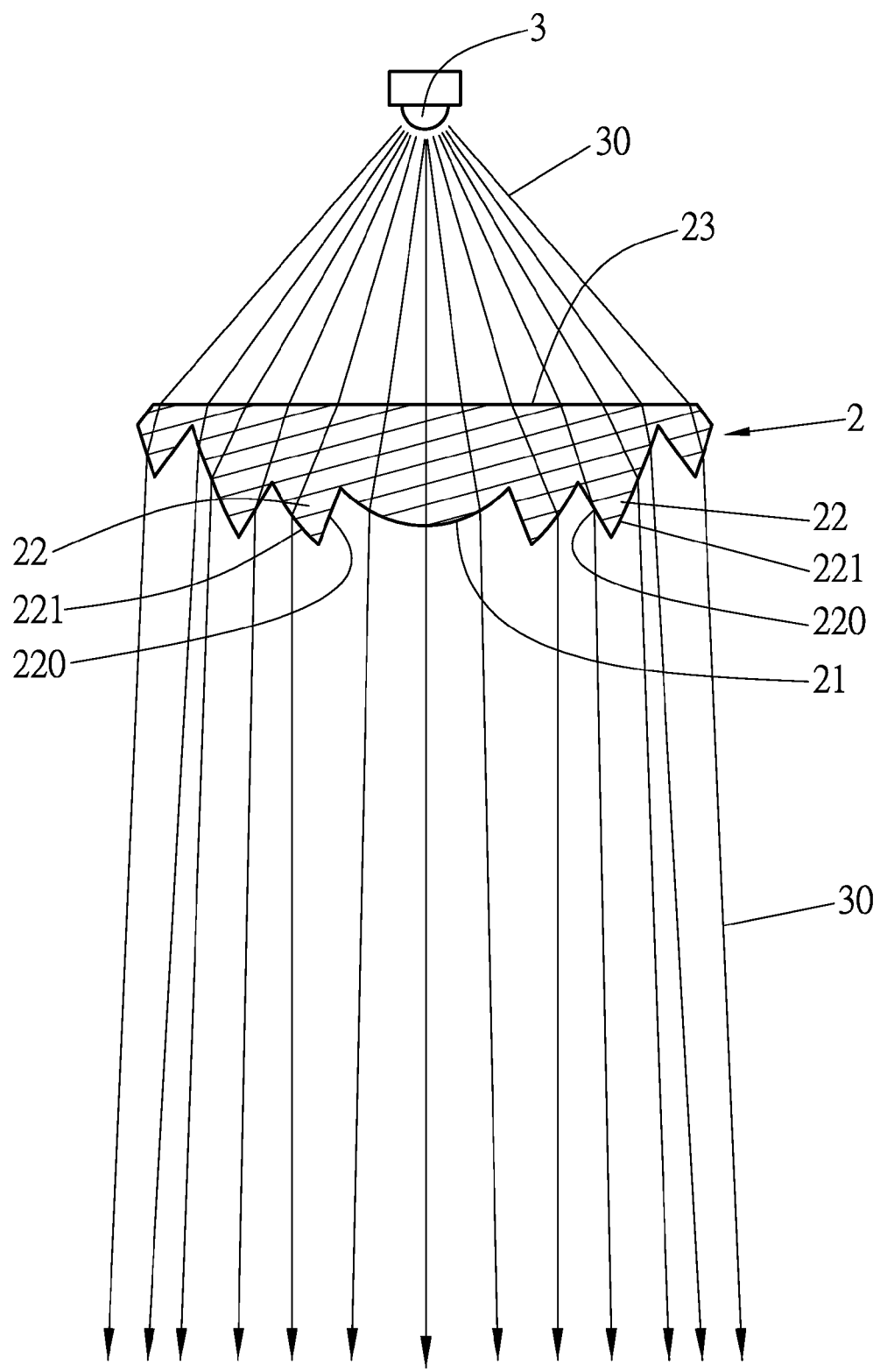
FIG. 7 is a top schematic view showing the light projection of the first embodiment of the present invention.
Figure 8:
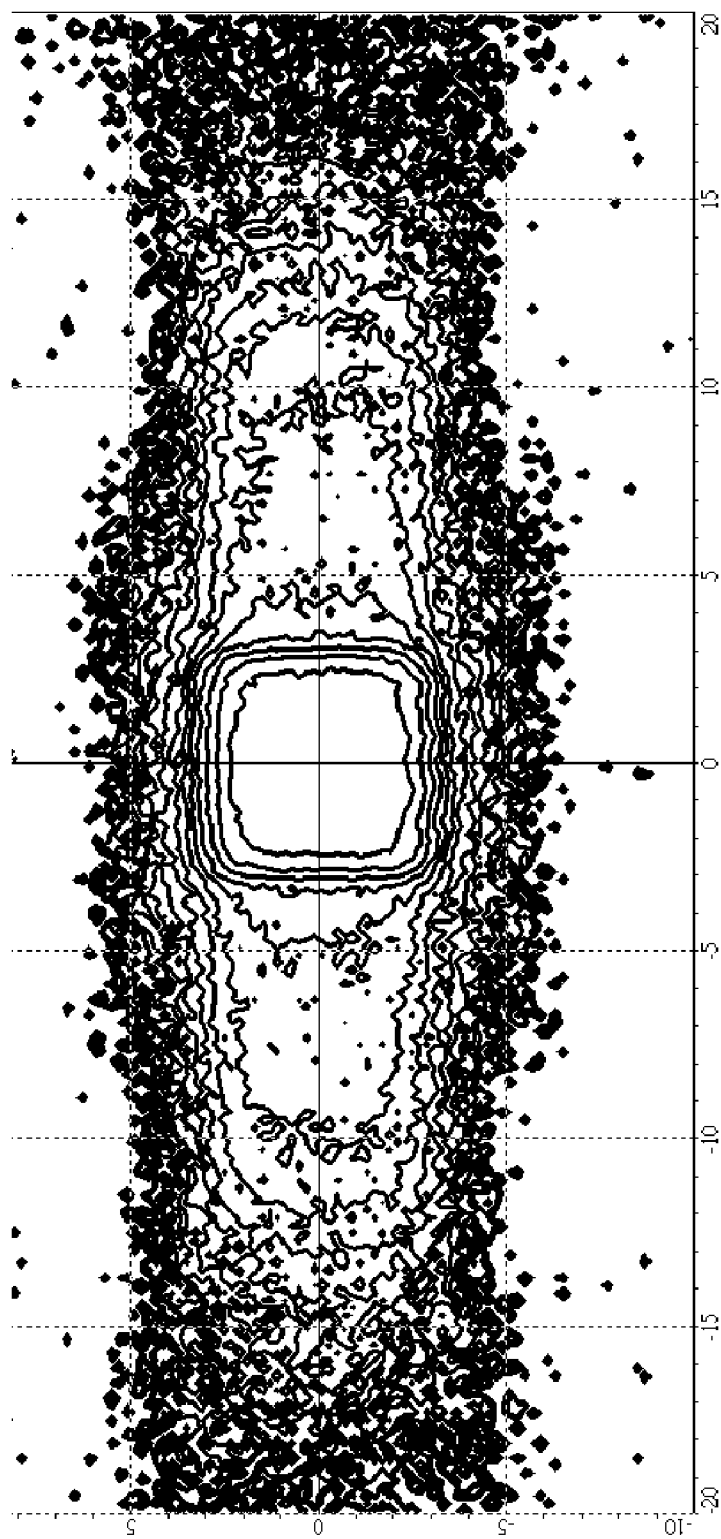
FIG. 8 is a diagram showing an illumination distribution of the first embodiment of the present invention.

The operation of the first embodiment of the present invention is illustrated in FIGS. 6 to 8. In use, the multi-focal lens is applied to a lighting device such that a light source 3 is located behind the flat surface 23 of the transparent body 2. The light rays 30 emitting from the light source 3 can go through the transparent body 2. Through refraction, the light rays incident on the edge of the transparent body 2 can be refracted by the convex refracting surfaces 221 of the peripheral portions 22 to enable the light rays to travel substantially parallel to the optical axis of the multi-focal lens, so that the lighting device can produce a long-distance and wide-area illumination. Specifically, both the oblique refracting surface 220 and the convex refracting surface 221 of each peripheral portion 22 can accept corresponding light rays refracted from the flat surface 23. For each peripheral portion 22, the oblique refracting surface 220 refracts the incident light rays to travel in a direction different from the corresponding convex refracting surface 221, so that a lighting pattern of alternating brightness can be obtained at the surrounding portion of the light passing through the transparent body 2. Thus, the present invention can increase the illumination distance and illumination area of the lighting device, and provide the lighting device with a lighting pattern. Moreover, the thickness and volume of the transparent body 2 can be significantly reduced, as compared with conventional converging lenses. Therefore, the production cost can be reduced.

Figure 9:
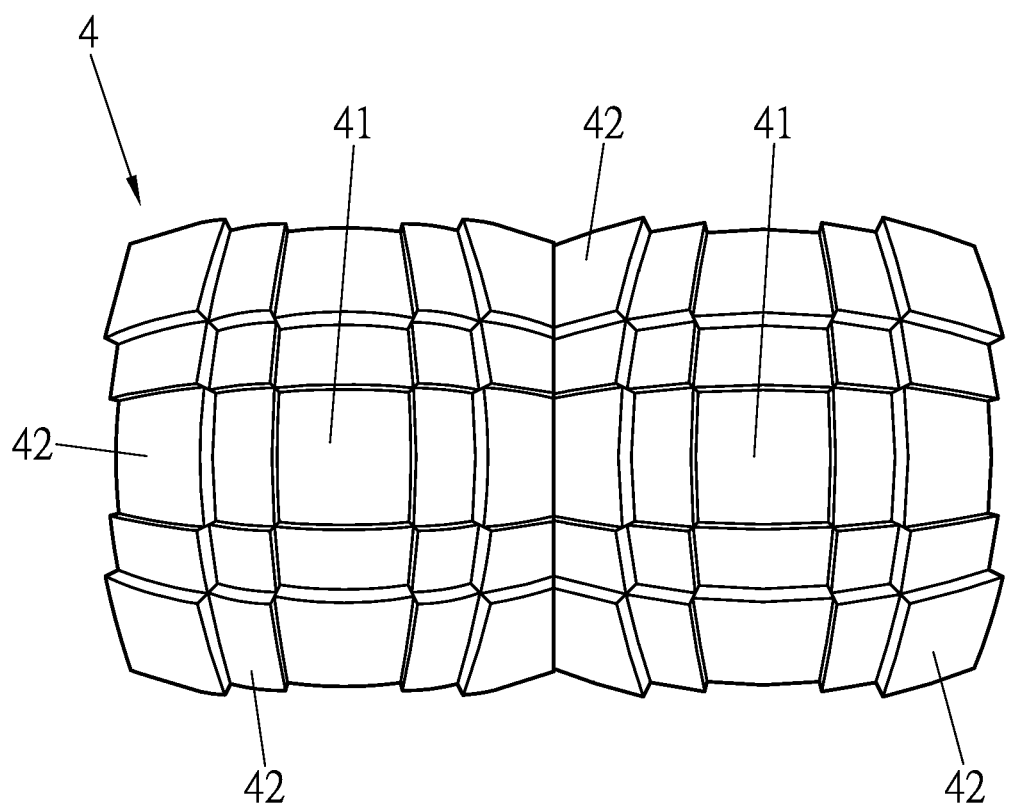
FIG. 9 is a front view showing a second embodiment of the present invention.
Figure 10:
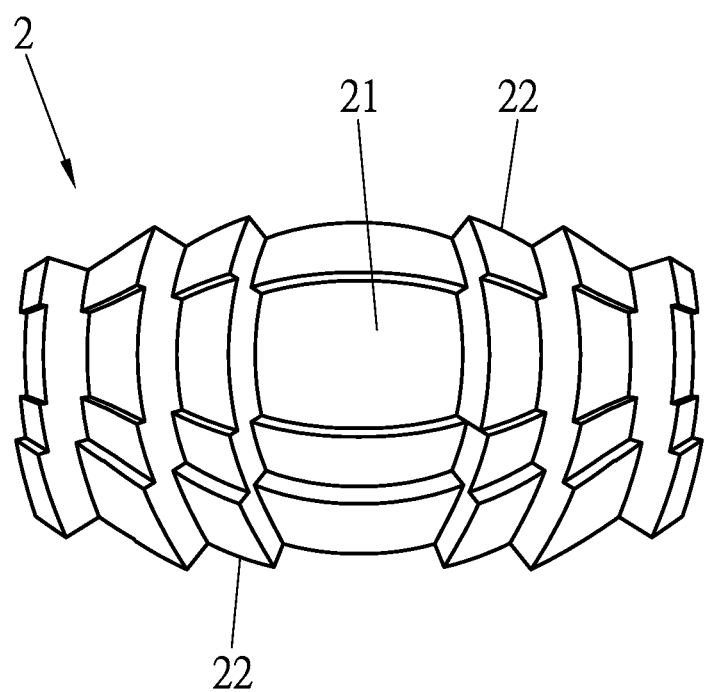
FIG. 10 is a front view showing another arrangement of the peripheral portions of the first embodiment of the present invention.
Figure 11:
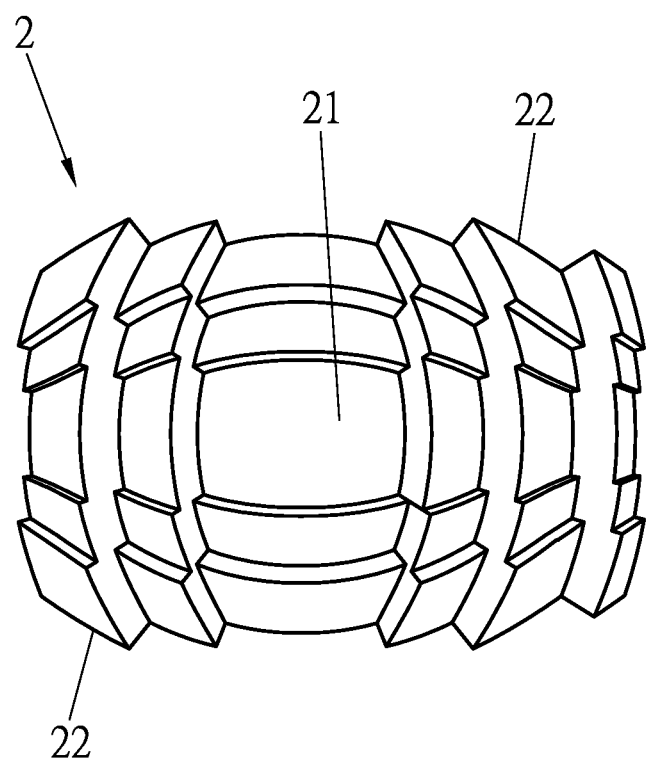
FIG. 11 is a front view showing a further arrangement of the peripheral portions of the first embodiment of the present invention.

FIG. 9 shows a second embodiment of the present invention, wherein the transparent body 4 comprises two optical units being arranged side by side and formed together. Each optical unit, which can be placed in front of a light source of a lighting device, includes a central portion 41 and multiple peripheral portions 42 around the central portion 41. The central portion 41 of each optical unit has a central convex refracting surface while each peripheral portion 42 of each optical unit has an oblique refracting surface and a convex refracting surface opposite to the oblique refracting surface, wherein the oblique refracting surface extends at an angle to the optical axis of the corresponding optical unit, and this is similar to the feature of the oblique refracting surface 220 of the first embodiment. Also, the central portion and the peripheral portions of each optical unit share a common flat surface, which is opposite to the refracting surfaces of the central portion and the peripheral portions. With this embodiment, an illumination of even wider area and a different lighting pattern can be obtained. Furthermore, as shown in FIGS. 2 to 5, the peripheral portions 22 of the multi-focal lens are arranged to be symmetrical both about vertical and horizontal central lines of the central portion 21. Nevertheless, the peripheral portions 22 can be arranged to be symmetrical only about a vertical central line of the central portion 21 (see FIG. 10), or alternatively, the peripheral portions 22 can be arranged to be symmetrical only about a horizontal central line of the central portion 21 (see FIG. 11), so that a lamp using the multi-focal lens of the present invention can produce a different lighting pattern.

Due to light refraction, which relates to an optical phenomenon: when a light beam enters into a different medium, the travel direction of the light beam can be changed, the present invention can be provided with various lighting patterns through different combinations of the peripheral portions.

The present invention can be applied to various lighting devices, such as vehicle lamp, street lamp, flashlight and projection light, wherein the multi-focal lens of the present invention can be placed in front of a light source, such as an LED and a light bulb, of a lighting device, so that the lighting device can produce a long-distance and wide-area illumination together with a lighting pattern.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-focal lens for a lighting device, which comprises:
a central portion and multiple peripheral portions around the central portion, wherein the central portion has a central convex refracting surface, each of the peripheral portions has an oblique refracting surface and a convex refracting surface opposite to the oblique refracting surface, the oblique refracting surface extending at an angle with respect to an optical axis of the multi-focal lens, and the central portion and the peripheral portions share a common flat surface opposite to the oblique refracting surfaces and the convex refracting surfaces of the peripheral portions and the central refracting surface of the central portion, wherein both the oblique refracting surface and the convex refracting surface of each peripheral portion accept corresponding light rays refracted from the flat surface and refracts the corresponding light rays in different directions, whereby the lighting device is able to produce a long-distance and wide-area illumination with alternating brightness at the surrounding portion thereof.

2. The multi-focal lens of claim 1, which is applied to an LED lighting device.

3. The multi-focal lens of claim 1, wherein the peripheral portions are symmetrical about a vertical central line of the central portion.

4. The multi-focal lens of claim 1, wherein the peripheral portions are symmetrical about a horizontal central line of the central portion.

5. The multi-focal lens of claim 1, wherein the peripheral portions are symmetrical both about a vertical central line of the central portion and a horizontal central line of the central portion.

6. A multi-focal lens for a lighting device, which comprises:
two optical units being arranged side by side and formed together, wherein each optical unit includes a central portion and multiple peripheral portions around the central portion, wherein the central portion has a central convex refracting surface, each of the peripheral portions has an oblique refracting surface and a convex refracting surface opposite to the oblique refracting surface, the oblique refracting surface extending at an angle with respect to an optical axis of the corresponding optical unit, and the central portion and the peripheral portions share a common flat surface opposite to the oblique refracting surfaces and the convex refracting surfaces of the peripheral portions and the central refracting surface of the central portion, wherein both the oblique refracting surface and the convex refracting surface of each peripheral portion accept corresponding light rays refracted from the flat surface and refracts the corresponding light rays in different directions, whereby the lighting device is able to produce a long-distance and wide-area illumination with a lighting pattern.

7. The multi-focal lens of claim 6, which is applied to an LED lighting device.

* * * * *